(12) United States Patent
    Carmichael

(10) Patent No.: US 11,568,312 B2
(45) Date of Patent: Jan. 31, 2023

(54) AUGMENTING MACHINE LEARNING MODELS TO INCORPORATE INCOMPLETE DATASETS

(71) Applicant: Upstart Network, Inc., San Carlos, CA (US)

(72) Inventor: Don Carmichael, Columbus, OH (US)

(73) Assignee: Upstart Network, Inc., San Mateo, CA (US)

( * ) Notice: Subject to any disclaimer, the term of this patent is extended or adjusted under 35 U.S.C. 154(b) by 707 days.

(21) Appl. No.: 16/702,479

(22) Filed: Dec. 3, 2019

(65) Prior Publication Data

US 2021/0166308 A1    Jun. 3, 2021

(51) Int. Cl.
    *G06Q 40/02*    (2012.01)
    *G06K 9/62*    (2022.01)
    (Continued)

(52) U.S. Cl.
    CPC ........... *G06N 20/00* (2019.01); *G06K 9/6256* (2013.01); *G06K 9/6282* (2013.01); *G06Q 40/025* (2013.01); *G06N 7/005* (2013.01)

(58) Field of Classification Search
    None
    See application file for complete search history.

(56) References Cited

U.S. PATENT DOCUMENTS

| | | |
|---|---|---|
| 2015/0026035 A1 | 1/2015 | Showalter |
| 2019/0138941 A1 | 5/2019 | Kam |

OTHER PUBLICATIONS

Sethia A, Patel R, Raut p. Data augmentation using generative models for credit card fraud detection. In 2018 4th International Conference on Computing Communication and Automation (ICCCA) Dec. 14, 2018 (pp. 1-6). IEEE. (Year: 2018).*

(Continued)

*Primary Examiner* — Vincent Gonzales
(74) *Attorney, Agent, or Firm* — Baker Botts L.L.P.

(57) ABSTRACT

Systems and methods for increasing the training value of input training datasets are described herein. In an embodiment, a server computer receives a plurality of input training datasets, each of the input training datasets comprising values for a plurality of parameters, a value indicating whether failure has occurred, and another value indicating the time of failure or the time of observation if no failure has occurred. For each input training dataset, the server computer generates a plurality of month-specific training datasets, each of which comprising a first value indicating a number of previous months where failure has not occurred and a second value indicating whether failure occurred during a month corresponding to the month-specific training data. The server computer trains a machine learning model using the plurality of month-specific training datasets. When the server computer receives a particular input dataset, the server computer generates a plurality of month-specific input datasets from the particular input dataset and uses the machine learning model to compute a plurality of month-specific likelihoods of failure of the particular item from the plurality of month-specific input datasets. This process allows a machine learning model to train off of both complete and incomplete datasets, giving the machine learning model access to current data and allowing for earlier implementation of machine learning in new business areas.

18 Claims, 6 Drawing Sheets

(51) Int. Cl.
*G06N 20/00* (2019.01)
*G06N 7/00* (2006.01)

(56) References Cited

OTHER PUBLICATIONS

Agbemava E, Nyarko IK, Adade TC, Bediako AK. Logistic regression analysis of predictors of loan defaults by customers of non-traditional banks in Ghana. European Scientific Journal. Jan. 1, 2016;12(1). (Year: 2016).*

James G, Witten D, Hastie T, Tibshirani R. An introduction to statistical learning. New York: springer; Jun. 2013, corrected 8th printing 2017. 441 pages. (Year: 2013).*

Sadoughi M, Lu H, Hu C. A deep learning approach for failure prognostics of rolling element bearings. In 2019 IEEE International Conference on Prognostics and Health Management (ICPHM) Jun. 17, 2019 (pp. 1-7). IEEE. (Year: 2019).*

Yeh IC, Lien CH. The comparisons of data mining techniques for the predictive accuracy of probability of default of credit card clients. Expert systems with applications. Mar. 1, 2009;36(2):2473-80. (Year: 2009).*

L. Riggins, "Augmenting Your Training Data for Image Recognition," Towards Data Science, pub. in United States Nov. 17, 2020, downloaded Jan. 26, 2021, 7 pp., Nov. 17, 2020.

B. Rowe, "What you need to know about data augmentation for machine learning," R-bloggers, pub. in United States Oct. 6, 2016, downloaded Jan. 26, 2021, 4 pp., Oct. 6, 2016.

J. Hoffmann et al., "Machine learning in a data-limited regime: Augmenting experiments with synthetic data uncovers order in crumpled sheets," Sci. Adv. 5 (4) eaau6792, pub. in United States, Apr. 26, 2019, 9 pp, Apr. 26, 2019.

U.S. Appl. No. 15/806,161, filed Nov. 7, 2017 (IFW), Nov. 7, 2017.

Agnieszka Dardzinska et al., "CHASE$_2$ Rule Based Algorithm for Information Systems of Type lambda" Active Mining 2003, LNAI 3430, pp. 255-267, 2005, 2003.

Table of Data Fields for Interagency Loan Data Request, https://www.fdic.govinews/news/financial/2013/FIL13012a.pdf (Year: 2013), 2013.

* cited by examiner

420 Incomplete Dataset with 7 Months of Observation $$\begin{pmatrix} 4 & 5 & 0 & 3 & 1 & 4 & 7 & 1 \\ 4 & 5 & 0 & 3 & 1 & 4 & 7 & 2 \\ 4 & 5 & 0 & 3 & 1 & 4 & 7 & 3 \\ & & & \vdots & & & & \\ 4 & 5 & 0 & 3 & 1 & 4 & 7 & 7 \end{pmatrix} \begin{pmatrix} 0 \\ 0 \\ 0 \\ \vdots \\ 0 \end{pmatrix}$$

Columns: Parameter A, Parameter B, Parameter C, Parameter D, Parameter E, Parameter F, Parameter G, Month Parameter | Failure Value

FIG. 4C

430 Incomplete Dataset with 4 Months of Observation and Possible Failure Value $$\begin{pmatrix} 4 & 5 & 0 & 3 & 1 & 4 & 7 & 1 \\ 4 & 5 & 0 & 3 & 1 & 4 & 7 & 2 \\ 4 & 5 & 0 & 3 & 1 & 4 & 7 & 3 \\ 4 & 5 & 0 & 3 & 1 & 4 & 7 & 4 \\ 4 & 5 & 0 & 3 & 1 & 4 & 7 & 5 \\ 4 & 5 & 0 & 3 & 1 & 4 & 7 & 6 \end{pmatrix} \begin{pmatrix} 0 \\ 0 \\ 0 \\ 0.5 \\ 0.25 \\ 0.12 \end{pmatrix}$$

Columns: Parameter A, Parameter B, Parameter C, Parameter D, Parameter E, Parameter F, Parameter G, Month Parameter | Failure Value

FIG. 4D

AUGMENTING MACHINE LEARNING MODELS TO INCORPORATE INCOMPLETE DATASETS

FIELD OF THE DISCLOSURE

The present disclosure generally relates to the technical field of computer-implemented machine learning algorithms. The disclosure relates more specifically to the technical field of training machine learning algorithms when datasets are incomplete.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Machine learning software tools allow computing devices to solve complex problems based on prior data. Generally, machine learning systems are trained using a large number of training datasets, each of which comprising a plurality of inputs and a verified output. For instance, classifiers can attempt to classify text based on prior text entries and prior classifications for those text entries.

Some machine learning systems are used to compute the probability of an event occurring within a particular period of time based on initial conditions. These machine learning systems may be utilized to compute the probability of a storm occurring in a given period of time, the probability of a machine failing during operation of a task, the probability of a person defaulting on a loan, or any number of possible event occurrences based on initial conditions.

Unfortunately, to properly train a machine learning system, a large number of datasets with definitive outcomes are needed. If a machine learning system is created to find the probability of a new piece of machinery failing within a five-year warranty period, the system would likely need a large number of machines that have been monitored for five years, together with outcome data for those machines during the period. Thus, in the initial few years of the machine's release, the system would have no way of accurately using a machine learning system to compute a probability of failure. Similarly, if a company is continuously issuing 3-year loans over a three-year period, where default occurs in a non-zero number of loans, it may be 3 years before a set of issued loans can be used as training data in a machine learning system designed to determine the probability of a loan defaulting.

The requirement for complete datasets, i.e. datasets covering a full period of monitoring, in a machine learning system can seriously hamper the early effectiveness of these systems. Without complete datasets, a server cannot use a machine learning system to accurately predict events. Thus, servers without access to years of data may be unable to generate useful predictions, thereby negatively impacting the effectiveness of the server computer. Additionally, the data currently available to the server describing an item currently being monitored is useless in the machine learning context, regardless of the fact that the dataset includes useful information.

Furthermore, if a machine learning system could be effectively trained on incomplete as well as complete datasets, performance of said machine learning system could make more accurate predictions than one trained on only complete datasets.

Thus, there is a need for a system that utilizes complete and incomplete datasets for the purpose of training a machine learning system to identify a temporally based likelihood of failure.

SUMMARY

The appended claims may serve to summarize the disclosure.

BRIEF DESCRIPTION OF THE DRAWINGS

In the drawings:

FIG. 4C depicts example sets of inputs and outputs generated from an incomplete dataset.

FIG. 4D depicts example sets of inputs and outputs generated from an incomplete dataset comprising a possible failure value.

DETAILED DESCRIPTION

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. SYSTEM OVERVIEW
3. TRAINING DATASETS
4. PARAMETERS
5. DATE SPECIFIC TRAINING DATASET AUGMENTATION
6. MACHINE LEARNING MODEL
7. BENEFITS OF CERTAIN EMBODIMENTS
8. HARDWARE OVERVIEW

1. General Overview

Methods for augmenting incomplete training datasets are described for use in training machine learning systems. According to an embodiment, a server computer receives a plurality of training datasets, including incomplete and complete training datasets. For each training dataset, the server computer generates month-specific training datasets which include a month value and an output value indicating whether failure occurred in the month corresponding to the month value. The server computer then trains the machine learning system using the month-specific training datasets. When an input dataset is received, the server computer generates a plurality of month-specific input datasets and uses the machine learning model to compute a plurality of month-specific likelihoods of failure. The month-specific likelihoods of failure may be utilized on their own and/or aggregated into a total likelihood of failure.

In an embodiment, a method comprises receiving a plurality of input training datasets, each of the input training datasets comprising values for a plurality of parameters and a value indicating success or a time of failure of an item corresponding to the input training dataset; for each input training dataset, generating a plurality of month-specific training datasets, each of which comprising a first value indicating a number of previous months where failure has not occurred and a second value indicating whether failure occurred during a month corresponding to the month-specific training data; training a machine learning model using the plurality of month-specific training datasets that were generated for each input training dataset, wherein inputs to the machine learning model comprise, at least, the first value and outputs to the machine learning model comprise the second value; receiving a particular input dataset comprising values for the plurality of parameters for a particular item; generating a plurality of month-specific input datasets, each of which comprising the plurality of parameters and a different month value; using the machine learning model, computing a plurality of month-specific likelihoods of failure of the particular item from the plurality of month-specific input datasets.

2. System Overview

Figure 1:
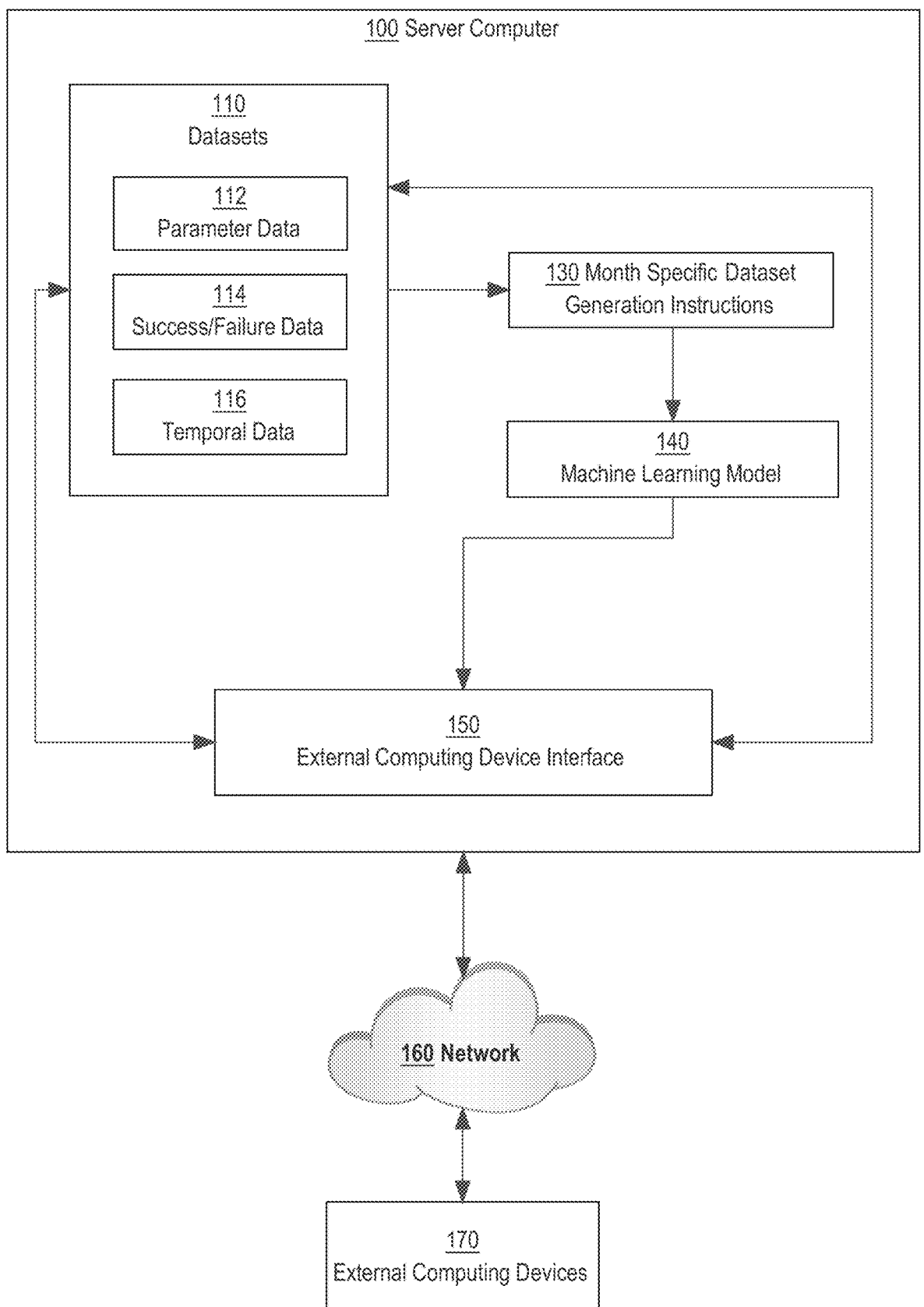
FIG. 1 depicts an example computer system in which the techniques described may be implemented according to an embodiment.

FIG. 1 depicts an example computer system in which the techniques described may be implemented according to an embodiment.

In the example of FIG. 1, a server computer 100 and an external computing device 170 are communicatively coupled to a data communications network 160. The network 160 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The server computer 100, external computing device 170, and other elements of the system may each comprise an interface compatible with the network 160 and are programmed or configured to use standardized protocols for communication across the networks such as TCP/IP, Bluetooth, and higher-layer protocols such as HTTP, TLS, and the like.

Server computer 100 may be implemented using a server-class computer or other computers having one or more processor cores, co-processors, or other computers. Server computer 100 may be a physical server computer and/or a virtual server instance stored in a data center, such as through cloud computing. The server computer 100 may be programmed or configured to generate and train a machine learning model. The server computer may comprise a plurality of communicatively coupled server computers including a server computer for training a machine learning model and a server computer for communicating with a client computing device. Server computer 100 stores datasets 110, month specific dataset generation instructions 130, machine learning model 140, and external computing device interface 150.

Datasets 110 comprise parameter data 112, success/failure data 114, and temporal data 116. Parameter data 112 includes data describing values for a plurality of parameters regarding a particular data item. Success/failure data 114 includes data describing whether the particular item was identified as a failure. Failure, as used herein, may refer to the occurrence of an event within a particular period of time. Temporal data 116 includes data describing an amount of time that has passed between initiation of the monitoring of an item and occurrence of an event for the time.

Generally, a complete dataset comprises a plurality of inputs and a definitive result for a particular item. For example, in the case of machinery monitoring during a particular operation, a complete dataset may include initial parameters describing the machinery, a value indicating whether the machinery was used successfully to complete the operation or whether the machinery broke down during the operation, and a value indicating time of failure. As another example, in the case of loan monitoring, a complete dataset may include initial parameters describing the loan requestor, a value indicating whether the requestor defaulted on the loan by the end of an observation period, and the payment period in which the borrower defaulted. Thus, complete datasets relating to a thirty-six month loan may include observations for the entire 36 month period or observations through the time of the target event.

Incomplete datasets also comprise parameter data and temporal data. The temporal data indicates a last monitored period of time for the dataset. Incomplete datasets may be stored describing items that are currently in progress and thus have not yet reached the end of the observation period. Thus, the temporal data may describe an amount of time that has passed between initiation of the monitoring of an item and a computation time. The computation time, as used herein, refers to an end time of the incomplete dataset where monitoring for a possible failure event is no longer required.

As an example, in the machinery context, the parameter data may include data describing the machinery and/or job while the temporal data describes an amount of time that has passed since the job was started. As the job has not been completed, the final failure status will be unknown if the machine has not yet failed. In the loan example, the parameter data may describe the loan requestor and/or information regarding the loan (i.e. loan term aka "monitoring period") while the temporal data describes an amount of time that has passed since the loan was granted or the amount of time until the loan defaulted if it has already defaulted. As the loan has not reached the end of specified monitoring period, only incomplete success/failure data is available.

Month specific dataset generation instructions comprise a set of instructions, which, when executed by the server computer, cause the server computer to perform calculations that convert a dataset into a plurality of month specific datasets.

Machine learning model 140 comprises a set of instructions which, when executed by the server computer, cause the server computer to train a set of machine learning equations and/or use a set of machine learning equations to compute a probability of success or failure. Examples of machine learning models include logistic regression models, gradient boosted decision trees, neural networks, and the like.

External computing device interface 150 comprises a set of instructions which, when executed by the server computer, causes the server computer to send data to and receive data from one or more external computing devices. External computing device interface 150 may include one or more application programming interfaces (APIs) and/or one or more graphical user interfaces (GUIs) which are used to communicate with external computing devices. For example, server computer 100 may communicate with external computers stored in one or more pieces of machinery which monitor the operation of the machinery. As another example, server computer 100 may communicate with one or more credit servers in order to obtain credit data on a loan requestor.

The instructions may be in machine executable code in the instruction set of a CPU and may have been compiled based upon source code written in JAVA, C, C++, OBJECTIVE-C, PYTHON, or any other human-readable programming language or environment, alone or in combination with scripts in JAVASCRIPT, other scripting languages and other programming source text. In another embodiment, the instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the server computer 100.

External computing device 170 is a computer that includes hardware capable of communicatively coupling external computing device 170 to one or more server computers, such as server computer 100 over one or more service providers. For example, external computing device 170 may include a network card that communicates with server computer 100 through a home or office wireless router (not illustrated in FIG. 1) coupled to an internet service provider. External computing device 170 may be a server-class computer, smart phone, personal computer, tablet computing device, PDAs, laptop, or any other computing device capable of transmitting and receiving information and performing the functions described herein.

FIG. 1 depicts server computer 100 and external computing device 170 as distinct elements for the purpose of illustrating a clear example. However, in other embodiments, more or fewer computers may accomplish the functions described herein. For example, a plurality of external computing devices may connect to the server computer 100. Additionally, server computer 100 may comprise a plurality of communicatively coupled server computers including a server computer for storing training datasets and a server computer for generating, training, and using a machine learning model.

3. Training Datasets

Figure 2:
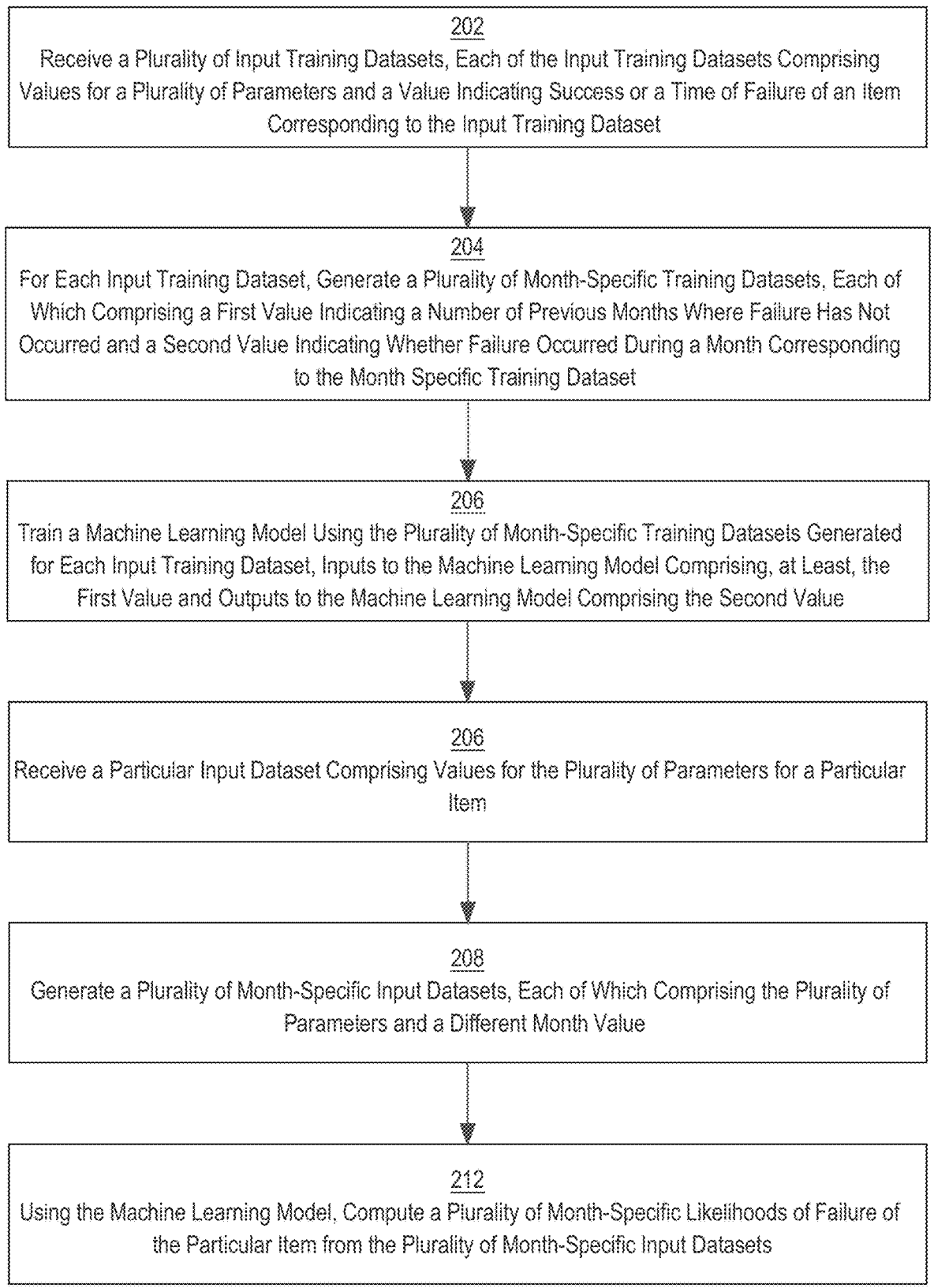
FIG. 2 depicts a method or algorithm for training and using a machine learning system to compute month-specific likelihoods of failure.

FIG. 2 depicts a method or algorithm for augmenting a machine learning system to compute probabilities of failure based, at least in part, on incomplete datasets. FIG. 2, and each other flow diagram, algorithm illustration, or other algorithmic explanation in this document is intended to disclose a functional description of a process that may be used as a basis of writing computer programs to implement the functions that are described herein and which cause a computer to operate in the new manner that is disclosed herein. FIG. 2 and each other flow diagram is provided to communicate such an algorithm at the same level of detail that is normally used, by persons of skill in the art to which this disclosure is directed, to communicate among themselves about plans, designs, specifications and algorithms for other computer programs of a similar level of complexity at a functional level, recognizing that the accumulated education, knowledge and skill of such persons will be sufficient to transform the illustrations into working computer programs.

At step 202, a plurality of input training datasets, each of the input training datasets comprising values for a plurality of parameters and a value indicating success or a time of failure of an item corresponding to the input training datasets. For example, a first input training dataset may identify an item that never failed during a monitoring phase while a second input training dataset may identify an item that failed during a specific month of the monitoring phase. The input training datasets may include complete datasets, for items that have completed a monitoring phase, and incomplete datasets, for items which have an ongoing monitoring phase.

As practical examples, a complete dataset for machinery monitoring may include initial parameters describing the machinery and a value indicating whether the machinery was used successfully to complete the operation or whether and when the machinery broke down during the operation. As another example, a complete dataset for loan monitoring may include initial parameters describing the loan requestor and a value indicating whether a monitoring period has passed without failure or whether and when the requestor defaulted on the loan during the monitoring period.

An incomplete dataset refers to a dataset where a monitoring period is ongoing. For example, a recently opened loan account may not have been monitored for long enough to be used in traditional systems. Thus, the dataset would be incomplete as the monitoring period has not ended. Where an item takes a long time to complete, such as on the order of years, a system may have access to a large number of incomplete datasets. The incomplete dataset may include temporal data indicating a time past which data is unavailable. For example, in the loan context, an incomplete dataset may include a value identifying a number of months between the start of the loan and a computation time corresponding to the last data available for the dataset. Thus, if a loan is in its sixth month during the use of the machine learning system, the incomplete dataset may include the parameters in addition to a value indicating that six months have passed without failure.

Datasets may be based on items with temporal end conditions. For example, a three-year loan has a success condition if it is paid off in three years. As another example, a bitcoin mining operation has a success condition if a bitcoin is successfully mined after a particular period of time.

Datasets based on items with temporal end conditions may also be subject to early failure. For example, a failure condition may be defined as default of a three-year loan prior to the end of the loans monitoring period. As another example, a failure condition may be defined as breakdown of a piece of machinery prior to a scheduled completion of a task.

While the present disclosure refers to success and failure, the use of the "failure" term is intended to refer to the occurrence of a condition during pendency of an item. Thus, "failure" and "success" as used herein refer to the occurrence or non-occurrence respectively of a particular event over a monitoring time period.

In some embodiments, the condition for "success" is termination of a period of time without the failure condition, such as in the loan and machinery examples described herein. In other embodiments, the condition for "failure" is termination of a period of time without the success condition occurring. For instance, an anti-virus tracker may identify a failure if a virus is identified within a monitoring period.

While methods are described in terms of success and failure, the methods described herein may be employed any time there is a conditional outcome and a temporal aspect. Thus, an outcome does not need to be defined as either a failure or success as long as occurrence or non-occurrence of an outcome is identified within a predetermined monitoring period. A key difference here is the ability to take datasets that are incomplete (i.e. have not completed an observation period) and use them to train a machine learning system alongside complete datasets (i.e. datasets that have been observed through the observation period). This can occur whenever a single-event is being monitored in conjunction with a set time period.

4. Parameters

Training datasets, as described herein comprise a plurality of inputs. The inputs are parameters that define initial conditions as well as changes in conditions prior to a completed output. Parameters may differ depending on the type of dataset. For example, parameters for a machinery dataset may include data describing the manufacturer of the machinery, the number of years the machinery has been in use, difficulty of the task, etc. The parameters may additionally include a temporal value indicating when, during a monitoring period, a failure occurred. For example, in the machinery context, a value may indicate how long the machinery was operable before it ceased to function while in the loan context, the value may indicate a period of time from an initial loan transaction until default of the loan.

Some datasets may differ from others on what parameters are included. For example, incomplete datasets may include a temporal parameter indicating a period of time between inception and a computation time. Thus, an incomplete dataset may indicate that it has been five hours and forty-nine minutes since inception of a task that is being monitored for twelve hours. Additionally, some datasets may include a status value indicating the status of the item. For example, a parameter may identify obstacles to a machine completing its job, such as reported errors.

Datasets may be stored as a plurality of rows in a columnar datastore wherein each row represents a different dataset and each column represents a parameter. Additionally and/or alternatively, the datasets may be stored as vectors of values wherein each value refers to a different parameter. Regardless of how the datasets are stored, the server computer is able to distinguish between different parameters of the dataset.

The practical example of a three-year loan is described herein. Parameter data for a three-year loan may include credit data, borrower data, loan data, temporal data, and loan status data. Credit data may include data derived from a credit report prior to a loan transaction, such as a FICO credit score, a revolving balance over a previous year, a number of prior bankruptcies, a number of prior defaults, a number of times a prior loan was 30/60/90 days late, and/or other data extracted from a credit report. Borrower data may include data regarding a borrowing entity, such as education level, income, and job type. Loan data may include data about the loan itself, such as the terms of the loan, an interest rate, and how the loan was obtained. Temporal data may include data defining a time period from the loan origination until failure (i.e. default), the end of the originally scheduled loan term (i.e. monitoring period), or the time of last data collection. Loan status data may include data regarding a current status of the loan, such as whether the loan is current, 30/60/90 days late, modified, paid, or defaulted.

Portions of the training datasets may be obtained from an outside source, such as a loan provider, and/or monitored and updated over time. For example, a loan provider computing device may store initial conditions of a loan as well as track the loan over time. Thus, as changes are made to the loan, the loan provider computing device may update the training dataset. When a computation is to be performed, the loan provider computing device may send the datasets, including complete and incomplete datasets, to the server computer. Additionally and/or alternatively, the same computing device may store the datasets and perform the computations described herein using the datasets.

5. Date Specific Training Dataset Augmentation

Referring again to FIG. 2, at step 202, a plurality of month-specific training datasets is generated for each input training dataset. Each of the month-specific training datasets comprise a first value indicating a number of previous months where failure has not occurred and a second value indicating whether failure occurred during a month corresponding to the month-specific training dataset. For example, the server computer may select a single input training dataset, such as a set of parameters and data indicating if and when a failure occurred and/or a period of time corresponding to the single input dataset, and generate a plurality of input rows, each of which corresponds to an output value.

Figure 3:
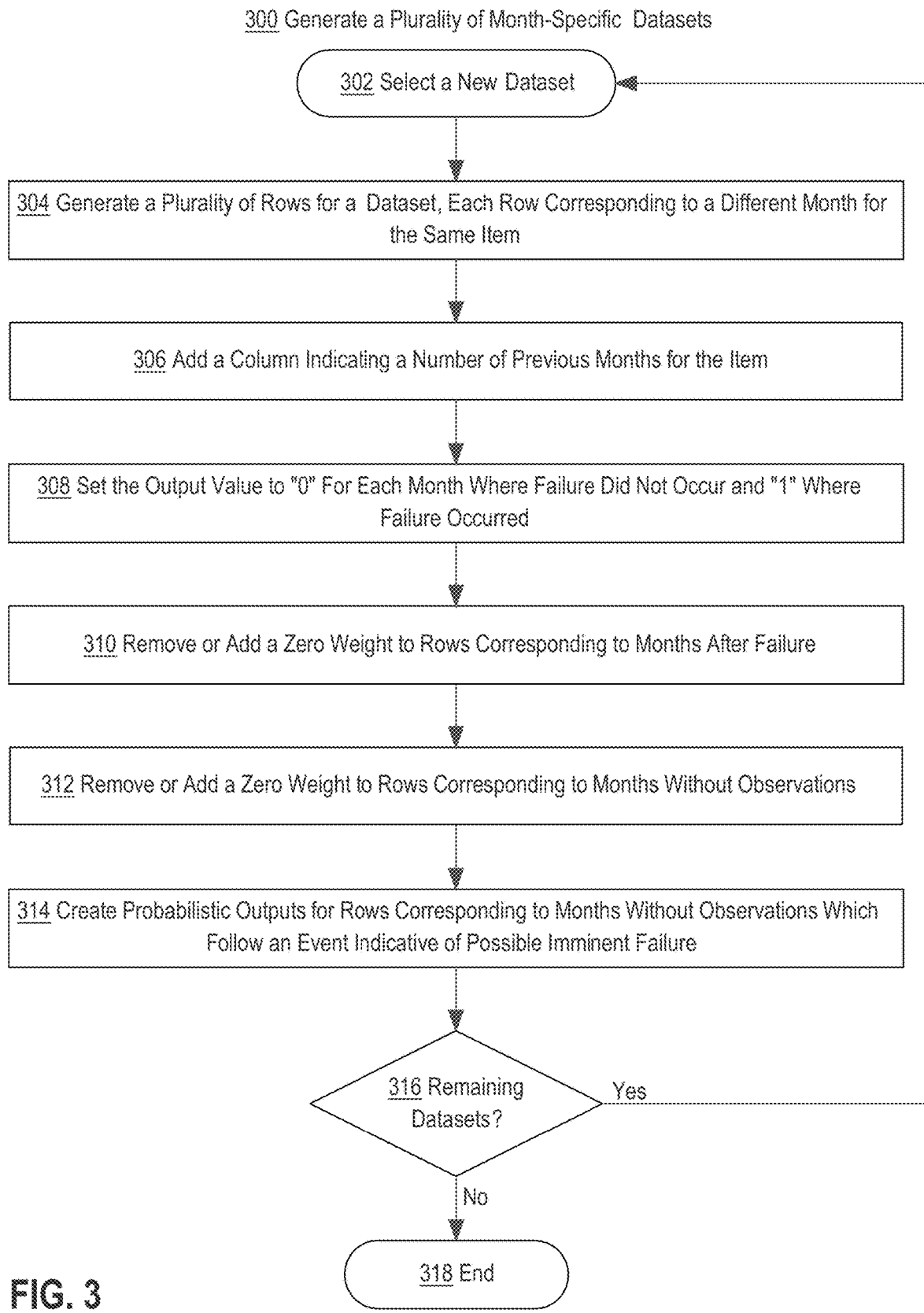
FIG. 3 depicts a method or algorithm of generating month-specific datasets out of complete or incomplete datasets.

FIG. 3 depicts a method or algorithm of generating month-specific datasets out of complete or incomplete datasets. FIG. 3 comprises method 300 which includes steps 302-318. Method 300 comprises a method for generating a plurality of month-specific datasets according to an embodiment. While FIG. 2 and FIG. 3 describe time periods measured by months, other embodiments may utilize other time period specific datasets, such as hours, days, weeks, months, or years depending on the length of a monitoring period and/or a period of updates. Thus, if a machine is monitored every hour, the server computer may generate a plurality of hour-specific datasets using the methods described herein.

At step 302, a new dataset is selected. For example, the server computer may perform method 300 for each input training dataset, thereby generating an even greater number of inputs than previously available.

At step 304, a plurality of rows is generated for the selected dataset, each row corresponding to a different month for the same item. For example, the server computer may identify a number of months for which observations are available. Thus, if a complete dataset includes thirty-six months of observation, the server computer may identify the number of months as thirty-six. If a dataset ended in failure at seven months or is incomplete with only seven months of observation, the server computer may identify the number of months as seven. The server computer may then generate a row for each of the identified months. Thus, for the thirty-six months of observation, the server computer may generate thirty-six rows. Each row may include a set of mirrored parameters. For example, user data for a loan or initial configuration data for a machine may be the same across each row.

At step 306, a column is added to the rows of data which indicates a number of previous months for the item. For example, the server computer may create a column with an incrementing value such that the value is different for each row and indicates a month number for that row. Thus, for the first month of observation, the value for the column may be a "1" while for the thirty-sixth month of observation, the value for the column may be a "36".

In some embodiments, each row is generated to include identical data, aside from the temporal data added in step 306. In other embodiments, rows may contain data that differ depending on the month. For example, monitored aspects of machinery may change over time, such as average temperature during a previous month or average number of hours of usage. As another example, in the loan context, the amount left to pay, prior payments, and prior data relating to late payments may change month to month. Thus, the server computer may add additional columns for one or more factors which differ over time and populate the values for the additional columns with values corresponding to the factor during the different months corresponding to the rows.

At step 308, an output value of "0" is set for each month where failure did not occur and an output value of "1" is set for each month where failure occurred. For example, the server computer may generate a vector to correspond to the plurality of rows where each value in the vector indicates whether a failure occurred during the month corresponding to the value's row. Thus, for the thirty-six month observation, the server computer may generate a 36×1 vector where each value is "0", while for the seven month observation which ended in failure, the server computer may generate a 7×1 vector where each value aside from the last value is "0" and the last value is "1".

At step 310, rows corresponding to months after a failure are removed or given zero weight. For example, in some embodiments, the server computer may apply a row generation scheme which creates a same number of rows for a plurality of datasets, such as thirty-six rows regardless of whether a failure has occurred. For each row after a failure occurred, the server computer may either remove the additional row or apply a zero weight to the row when training the machine learning system.

At step 312, rows corresponding to months without observations are removed or given zero weight. For example, the row generation scheme may create a same number of rows regardless of whether the dataset is a complete dataset or incomplete dataset. For incomplete datasets which do not include observations for every month, the server computer may either remove each additional row after a last observation or apply a zero weight to each row after a last observation. Thus, if an incomplete dataset only included seven months of observation, the server computer may remove every row after the seventh row.

At step 314, probabilistic outputs for rows corresponding to months without observations which follow an event indicative of possible failure are created. For example, the server computer may detect particular events within a dataset that are indicative of a possible failure within incomplete datasets. As an example, a particular loan being late during a last monitored month in an incomplete dataset may be indicative of possible failure. As another example, particular parameters of a machine may indicate possible failure, such as temperatures exceeding a threshold value.

If an event indicative of possible failure is identified, the server computer may generate probabilistic outputs based on the event. For example, the server computer may use previous complete and incomplete datasets to identify all instances of the event. The server computer may compute a failure percentage by dividing a count of a number of instances of the event that were followed by failure by a count of a total number of instances of the event. Thus, if a particular event occurred four times when it was followed by a failure and six times when it was not followed by a failure, the server computer may compute the probability of failure based on the particular event as forty percent.

A practical example for computing probabilistic outputs for events indicative of possible failure is described herein with respect to a loan example. A loan may be identified to fail as of the first month of late payment despite default of a loan being defined as multiple months of non-payment. Thus, if a loan is late on the seventh month and no payments are made through the tenth month, the loan may be considered to have failed on the seventh month. Additionally, if the loan is late on the seventh month and in the eighth month the late amount is paid off, but the eighth month payment is not received, the loan may be considered to have failed in the eighth month if no further payments are received to the loan. Thus, incomplete datasets may include an undiagnosed failure, i.e. a failure that has yet to be identified as a failure.

Thus, if a loan is marked as "late" at the end of an incomplete dataset, the server computer may compute a probability of failure beginning at the initial late date. The server computer may use a plurality of failure and complete training datasets to compute the probability of failure as the number of times a loan was late and failed divided by the total number of times a loan was late. More complex equations may be more situation specific. For example, if a loan is late for a third time, the server computer may use a probability of failure based on loans being late a third time. This may be computed using the number of times a loan was late three times and failed on the third time, divided by the total number of times a loan was late three times. More complex means of computing the probability of failure may be used as well, such as using other attributes to narrow the dataset for computing the probability of failure, or using a machine learning system which computes probability of failure at a particular month based on late status and other parameters.

As a failure can occur on the initial date of the event or during a different month, the server computer may use a plurality of failure and complete training sets to compute a plurality of likelihoods of failures based on the event, each corresponding to a different month. For example, if a loan is two and a half months late at a last monitored month, the server computer may compute a probability that the last monitored month is the failure month, that the prior month was the failure month, and that two months prior to the last monitored month was the failure month. Thus, the server computer is able to augment previous data which was identified as non-occurrence of the condition based on a probability that the condition had occurred. For instance, in the loan example, the initial missed payment may or may not be the start of a failure, and thus would be identified as a failure only if default occurred. The methods for computing the probabilities for different months may be similar to those described herein. For example, the probability that a prior month is the failure month may be computed as the number of instances where a loan was late by the same number of months and was the failure month divided by the number of instances where a loan was late by the same number of months.

Thus, using information about the item in the last monitored time period, the server computer may generate probabilities of failure for incomplete training datasets. The server computer may use the probabilities of failures as outputs for particular rows in the training dataset. For example, if an incomplete training dataset covers seven months and has an event indicative of failure on the last month, the server computer may, instead of using a "0" or "1" for the output for the last month, the server computer may use a value between "0" and "1" which corresponds to the probability of failure. Thus, if the probability of failure is 50%, the output value for that row may be 0.5.

If probabilities of failure are generated for multiple months, the server computer may augment rows for each month with a probability of failure. Thus, if probabilities of failure are computed for three months including the last monitored month, the set of rows may augment the two rows prior to the last monitored month to include probabilities of failure instead of a value indicating non-occurrence of failure. The outputs for the last three rows may comprise the computed probabilities of failure.

Referring again to FIG. 3, at step 316, if any datasets remain, the server computer selects a new dataset at step 302 and performs the process of steps 304-314 as relevant for the next dataset. If the server computer determines that no datasets remain, the process ends at step 318. The datasets may then be used to train a machine learning model as described herein.

FIG. 4A, FIG. 4B, FIG. 4C and FIG. 4D depict example sets of inputs and outputs generated from different datasets. FIG. 4A, FIG. 4B, FIG. 4C and FIG. 4D are intended to provide a practical example for the purpose of clarifying the steps of FIG. 3 and embodiments may differ from FIG. 4A, FIG. 4B, FIG. 4C and FIG. 4D in parameter type, parameter number, and/or parameter variability across different months.

Figure 4A:
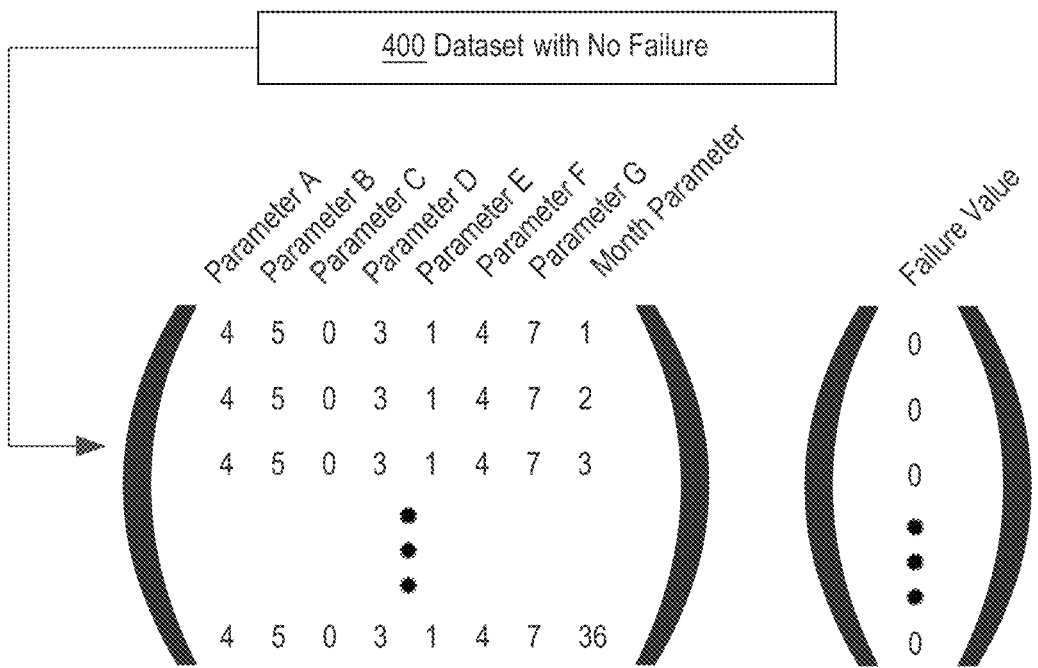
FIG. 4A depicts example sets of inputs and outputs generated from a complete dataset.

FIG. 4A depicts example sets of inputs and outputs generated from a complete dataset. The complete dataset with no failure (step 400) is used to generate a plurality of rows of inputs. As shown in FIG. 4A, the rows comprise a plurality of copies of the same parameter data with the only variation being the month parameter which continually increments until reaching the final month which, in the embodiment of FIG. 4A, is the $36^{th}$ month. As the dataset includes no failures, the output vector includes only 0's for each row of the input matrix.

Figure 4B:
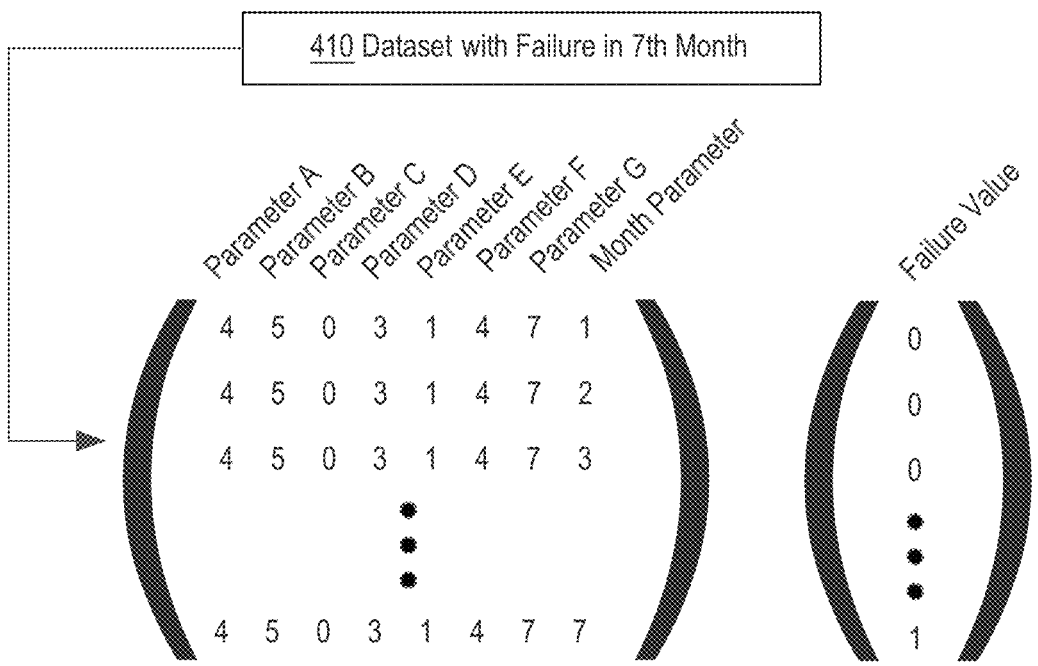
FIG. 4B depicts example sets of inputs and outputs generated from a dataset in which a failure occurred.

FIG. 4B depicts example sets of inputs and outputs generated from a dataset in which a failure occurred. If the dataset was monitored for a complete monitoring period, the dataset would be a complete dataset, while the dataset may be an incomplete dataset if there were only 9 months of observation with the failure occurring in the $7^{th}$ month. The dataset with a failure in the $7^{th}$ month (step 410) is used to generate a plurality of rows of inputs. As the failure occurred in the $7^{th}$ month, only seven input rows are generated. As with FIG. 4A, each row comprises the same values for Parameters A-G, but comprises a different month parameter. The output vector similarly comprises a "0" value for each row corresponding to a month where a failure did not occur, i.e. months 1-6, and a "1" value for the month where the failure occurred, i.e. month 7.

FIG. 4C depicts example sets of inputs and outputs generated from an incomplete dataset. The incomplete dataset with 7 months of observation (step 420) is used to generate a plurality of rows of inputs. As the last monitored month was the $7^{th}$ month, only seven input rows are generated. The input matrix of FIG. 4C is the same as the input matrix of FIG. 4B in that each comprises 7 rows and each input row comprises the same values. The difference between FIG. 4C and FIG. 4B is that the output vector in FIG. 4C does not contain a "1" in the row corresponding to the $7^{th}$ month, as no failure occurred in the seven months of observation.

FIG. 4D depicts example sets of inputs and outputs generated from an incomplete dataset comprising a possible failure value. The incomplete dataset with 4 months of observation and a possible failure value (step 430) is used to generate a plurality of rows and inputs. If no possible failure event had occurred, the fourth, fifth, and sixth row would have a 0 as the output value. As an event indicating a possibility of failure had occurred, the server computer is able to use the event data to augment the previous rows of inputs to correspond to the probabilities of failure. As with FIG. 4A, FIG. 4B, FIG. 4C and FIG. 4D, each parameter value is the same for each row and each month parameter value increments from the previous row. The failure values are "0" for each month where the failure did not occur and are computed probabilistic values for the last three months where a possible failure exists.

FIG. 3 method 300, as illustrated by FIG. 4A, FIG. 4B, FIG. 4C and FIG. 4D allows a server computer to utilize datasets that would have otherwise been unavailable. For example, in the initial years of monitoring an item where data is generally unavailable, ongoing datasets can be extremely valuable but useless for training a machine learning system, as the incomplete aspect of the dataset means the system cannot treat the dataset as a failure nor as a dataset that has not failed. By breaking one set of inputs into a plurality of inputs and utilizing data which indicates a probability of failure, the server computer is able to turn incomplete training datasets into a plurality of complete training inputs and outputs. The use of incomplete datasets creates more access to data for machine learning systems and allows businesses to implement machine learning earlier in the product life cycle.

6. Machine Learning Model

Referring again to FIG. 2, at step 206, the system trains a machine learning model using the plurality of month-specific training datasets generated for each input training dataset, inputs to the machine learning model comprising, at least, the first value and outputs to the machine learning model comprising the second value. For example, the server computer may train a machine learning model, such as a gradient boosted decision tree, logistic regression model, neural network, or other machine learning model, using each of the generated rows as inputs and the data indicating failure during a month as outputs.

As an example, for a dataset covering thirty months where a failure occurred in the thirtieth month, the server computer may have thirty rows of training inputs to use to train the machine learning model, each input row identifying a month corresponding to the row and each output indicating whether a failure occurred in the month corresponding to the row. Thus, the output values for each row other than the final row may be "0" to indicate that a failure did not occur in that month, but may be "1" for the final row to indicate that a failure did occur in the thirtieth month. As mentioned above, other parameters may be identical across rows corresponding to the same initial dataset. In some embodiments, month specific parameters may differ across the rows based on other monitored data.

At step 206, a particular input dataset is received comprising values for the plurality of parameters for a particular item. For example, the server computer may receive initial parameters for an item, such as a machine or loan, for which to compute likelihoods of failure. Practical examples may include initial parameters for a requester of a loan or initial operating parameters for a machine.

At step 208, a plurality of month-specific input datasets is generated for the item, each of which comprising the plurality of parameters and a different month parameter. For example, if an item is to be monitored over thirty-six months, the server computer may generate thirty-six input rows, each of which comprising the same parameters but comprising a different value for a month parameter.

At step 212, a plurality of month-specific likelihoods of failure of the particular item are computed from the plurality of month-specific input datasets using the machine learning model. For example, the server computer may use each of the month-specific input datasets to compute an output using the machine learning model. Thus, if thirty-six rows of inputs were created, the server computer may compute thirty-six output values, each corresponding to a different row and a different month.

The systems and methods described herein allow a server computer to individually compute probabilities of failure for different months for an item. As opposed to traditional approaches, the approaches described herein allow for the computation of failure to occur during the monitoring of an item, thereby allowing better tracking during months when a failure is more likely to occur. As an example, the server computer may store a threshold probability of failure value. If the probability of failure for an upcoming month exceeds the threshold probability of failure value, the server computer may perform one or more responsive actions, such as sending a notification, reducing a load on a machine, sending notifications to a borrower of a loan, or any other action to mitigate the likelihood of failure occurring.

The server computer may additionally aggregate the probabilities of failure across each month to generate a total probability of failure across each month. Aggregating the probabilities of failure may comprise simple calculations, such as adding all probabilities of failure for each month, or more complex calculations, such as:

$$P = \sum_{i=1}^{m} p_i * \prod_{j=1}^{i-1} (1 - p_j)$$

where m is the number of months, P is the total probability of failure, and p is a probability of failure for a particular month. The aggregated total probability of failure may be used to perform one or more responsive actions, such as sending a notification, automatically declining a loan, automatically removing a particular item of machinery, or automatically setting terms for loans or operating parameters for machines. A similar threshold technique may be utilized wherein particular actions are automatically performed if the aggregated value is above a particular threshold.

While methods are described with respect to computing probabilities of failure, in other embodiments the server computer may compute a probability of success based on the input dataset. For example, the server computer may generate the plurality of month-specific training datasets to indicate whether each month was successful and use the plurality of month-specific training datasets to train a machine learning model for computing a likelihood of success of the item.

Based on the computed probability of success or failure, the server computer is able to perform particular actions. In the machinery context, the server computer may select machinery to use which has a low probability of failure instead of machinery which has a high probability of failure. In the loan context, the server computer may determine whether to issue a loan based on probability of default. The server computer may also determine that items with high probability of failure are to be monitored more carefully than items with low probabilities of failure. Additionally, aspects of the item may be determined based on probability of failure. For instance, an amount of time a machine operates in a single sitting may be selected based on the machine's probability of failure. As another example, values for a loan, such as the interest of the loan or collateral may be based on the probability of default for the loan.

8. Benefits of Certain Embodiments

The methods described herein provide a computing device with a method of increasing the value of incomplete datasets to a machine learning model, thereby increasing performance of the computing system when training a machine learning system. By turning datasets into month-specific datasets, a server computer increases its ability to produce accurate machine learning models in early stages of tracking. Thus, the computer device may produce these models faster as the data is available for use to the server computer sooner. Furthermore, the methods described herein allows the computer device to produce better machine learning models than previously possible, because the computer device will be allowed to train on data from incomplete as well as complete datasets.

The systems and methods described herein provide the benefit of utilizing datasets in real-time. Thus, datasets with ongoing monitoring can be used as training into a machine learning system. This approach provides advantages over post-monitoring systems as they can be trained using more current data, thereby increasing the amount of information that can be used to train the machine learning system. These advantages are even greater in early stages of tracking where most available data reside in incomplete datasets, i.e. datasets in which monitoring is ongoing.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
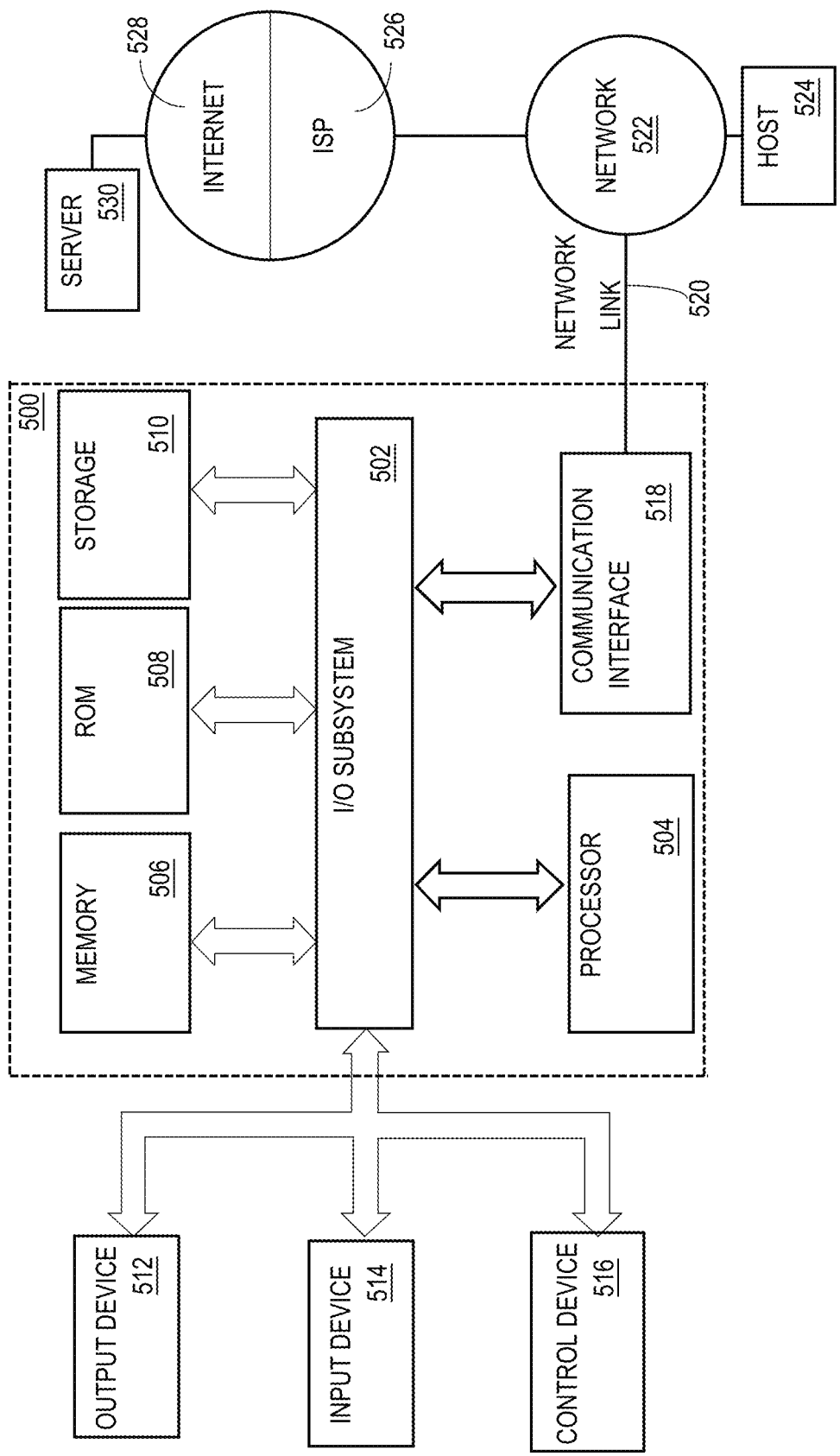
FIG. 5 depicts a block diagram that illustrates a computer system upon which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DBaaS provider manages or controls the underlying cloud infrastructure, applications, and servers, including one or more database servers.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A data processing system comprising:
   one or more processors;
   a memory coupled to the one or more processors and storing instructions which, when executed by the one or more processors, cause performance of:
   receiving a plurality of input training datasets, each of the input training datasets comprising values for a plurality of parameters and a value indicating the absence of a failure or a time of failure of an item corresponding to the input training dataset;
   for each input training dataset, generating a plurality of month-specific training datasets, each of which comprising a first value indicating a number of previous months where failure has not occurred and a second value indicating whether failure occurred during a month corresponding to the month-specific training data;
   training a machine learning model using the plurality of month-specific training datasets that were generated for each input training dataset, wherein inputs to the machine learning model comprise, at least, the first value and outputs to the machine learning model comprise the second value;
   receiving a particular input dataset comprising values for the plurality of parameters for a particular item;
   generating a plurality of month-specific input datasets, each of which comprising the plurality of parameters and a different month value;
   using the machine learning model, computing a plurality of month-specific likelihoods of failure of the particular item from the plurality of month-specific input datasets.

2. The system of claim 1, the machine learning model comprising a set of program instructions that implement a logistic regression and/or a gradient boosted decision tree.

3. The system of claim 1, the one or more input training datasets comprising data describing loan transactions that have neither matured nor defaulted.

4. The system of claim 3, the plurality of parameters relating to a recipient of the associated loan transaction.

5. The system of claim 1, further comprising instructions which when executed cause generating the plurality of month-specific training datasets by, for datasets which include a failure, generating an input row for each month within a particular period of time and removing or applying a zero weight to input rows corresponding to months past a failure month.

6. The system of claim 1, further comprising instructions which when executed cause generating the plurality of month-specific training datasets by, for incomplete datasets, generating an input row for each month within a particular period of time and removing or applying a zero weight to input rows corresponding to months past a last observed month.

7. The system of claim 1, further comprising instructions which when executed cause generating the plurality of month-specific training datasets by, for incomplete datasets which include a value indicative of possible failure, augmenting an input row for a predetermined number of months prior to the last observed month to include an output value indicating a likelihood of failure of the particular item based, at least in part, on the value indicative of possible failure.

8. The system of claim 1, further comprising instructions which when executed cause computing an aggregated likelihood of failure for the particular item from the plurality of month-specific likelihoods of failure.

9. The system of claim 8, further comprising instructions which when executed cause determining that the aggregated likelihood of failure for the particular item is greater than a stored threshold value and, in response, performing a responsive action.

10. A method comprising:
    receiving a plurality of input training datasets, each of the input training datasets comprising values for a plurality of parameters and a value indicating absence of failure or failure of an item corresponding to the input training dataset;

for each input training dataset, generating a plurality of month-specific training datasets, each of which comprising a first value indicating a number of previous months where failure has not occurred and a second value indicating whether failure occurred during a month corresponding to the month-specific training data;

training a machine learning model using the plurality of month-specific training datasets that were generated for each input training dataset, wherein inputs to the machine learning model comprise, at least, the first value and outputs to the machine learning model comprise the second value;

receiving a particular input dataset comprising values for the plurality of parameters for a particular item;

generating a plurality of month-specific input datasets, each of which comprising the plurality of parameters and a different month value;

using the machine learning model, computing a plurality of month-specific likelihoods of failure of the particular item from the plurality of month-specific input datasets.

11. The method of claim 10, the machine learning model comprising a set of program instructions that implement a logistic regression and/or a gradient boosted decision tree.

12. The method of claim 10, the one or more input training datasets comprising data describing loan transactions that have neither matured nor defaulted.

13. The method of claim 12, the plurality of parameters relating to a recipient of the associated loan transaction.

14. The method of claim 10, further comprising generating the plurality of month-specific training datasets by, for datasets which include a failure, generating an input row for each month within a particular period of time and removing or applying a zero weight to input rows corresponding to months past a failure month.

15. The method of claim 10, further comprising generating the plurality of month-specific training datasets by, for incomplete datasets, generating an input row for each month within a particular period of time and removing or applying a zero weight to input rows corresponding to months past a last observed month.

16. The method of claim 10, further comprising generating the plurality of month-specific training datasets by, for incomplete datasets which include a value indicative of possible failure, augmenting an input row for a predetermined number of months prior to the last observed month to include an output value indicating a likelihood of failure of the particular item based, at least in part, on the value indicative of possible failure.

17. The method of claim 10, further comprising computing an aggregated likelihood of failure for the particular item from the plurality of month-specific likelihoods of failure.

18. The method of claim 17, further comprising determining that the aggregated likelihood of failure for the particular item is greater than a stored threshold value and, in response, performing a responsive action.

\* \* \* \* \*